US010154458B2

(12) United States Patent
Kanamarlapudi et al.

(10) Patent No.: US 10,154,458 B2
(45) Date of Patent: Dec. 11, 2018

(54) METHOD AND APPARATUS FOR MAINTAINING REACHABILITY OF A USER EQUIPMENT IN IDLE STATE

(71) Applicant: QUALCOMM Incorporated, San Diego, CA (US)

(72) Inventors: Sitaramanjaneyulu Kanamarlapudi, San Diego, CA (US); Liangchi Hsu, San Diego, CA (US); Rashid Ahmed Akbar Attar, San Diego, CA (US); Girish Valluru, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 445 days.

(21) Appl. No.: 14/231,023

(22) Filed: Mar. 31, 2014

(65) Prior Publication Data
US 2015/0063225 A1    Mar. 5, 2015

Related U.S. Application Data

(60) Provisional application No. 61/873,703, filed on Sep. 4, 2013.

(51) Int. Cl.
*H04W 52/02* (2009.01)
*H04W 76/25* (2018.01)
(Continued)

(52) U.S. Cl.
CPC ......... *H04W 52/0229* (2013.01); *H04L 67/24* (2013.01); *H04W 76/25* (2018.02);
(Continued)

(58) Field of Classification Search
CPC ............... H04W 52/02; H04W 76/045; H04W 52/0229; H04W 76/046; H04W 52/0209; H04W 52/0219; H04L 67/24
See application file for complete search history.

(56) References Cited

U.S. PATENT DOCUMENTS 8,099,483 B2    1/2012    Smith et al.
8,437,313 B2    5/2013    Salomone et al.
(Continued)

FOREIGN PATENT DOCUMENTS

CN    101627604 A    1/2010
CN    102084697 A    6/2011
(Continued)

OTHER PUBLICATIONS

International Search Report and Written Opinion—PCT/US2014/053737—ISA/EPO—dated Feb. 27, 2015. (9 total pages).

*Primary Examiner* — Jenee Holland
(74) *Attorney, Agent, or Firm* — Arent Fox, LLP and Qualcomm Incorporated

(57) ABSTRACT

Certain aspects of the present disclosure relate to apparatuses and methods for maintaining reachability at a user equipment (UE). In one aspect, the apparatuses and methods are configured to detect a change in a radio connection between the UE and a peer entity, wherein the change in the radio connection is associated with the UE entering an idle state, to communicate to the peer entity, in response to detecting the change in the radio condition, an indication that the UE is to enter the idle state and is reachable for a specified duration of time while in the idle state, and to enter the idle state after communicating the indication to the peer entity. In another aspect, the apparatuses and methods are configured to communicate to the peer entity an indication that the peer entity is not to attempt to reach the UE during the specified duration of time.

40 Claims, 9 Drawing Sheets

US 10,154,458 B2
Page 2

(51) Int. Cl.
*H04W 76/27* (2018.01)
*H04L 29/08* (2006.01)
*H04W 76/19* (2018.01)
*H04W 76/28* (2018.01)

(52) U.S. Cl.
CPC ............ *H04W 76/27* (2018.02); *H04W 76/19* (2018.02); *H04W 76/28* (2018.02); *Y02D 70/1222* (2018.01); *Y02D 70/1224* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01)

(56) References Cited

U.S. PATENT DOCUMENTS

| | | | |
|---|---|---|---|
| 8,761,064 B2 | 6/2014 | Soliman et al. | |
| 2002/0024929 A1* | 2/2002 | Brueckner | H04L 12/42 370/222 |
| 2002/0087698 A1* | 7/2002 | Wilson | H04L 67/14 709/227 |
| 2002/0106997 A1* | 8/2002 | Barber | H04W 52/0241 455/343.1 |
| 2004/0029586 A1* | 2/2004 | Laroia | H04W 16/12 455/434 |
| 2004/0185820 A1* | 9/2004 | Ogura | H04W 52/0245 455/343.1 |
| 2005/0009535 A1* | 1/2005 | Cherian | H04W 84/08 455/455 |
| 2005/0129009 A1* | 6/2005 | Kitchin | H04L 12/12 370/389 |
| 2005/0188015 A1* | 8/2005 | Attwell | H04L 12/2854 709/205 |
| 2006/0168343 A1* | 7/2006 | Ma | H04W 52/38 709/245 |
| 2007/0005744 A1* | 1/2007 | Rothman | H04L 67/104 709/223 |
| 2008/0208990 A1 | 8/2008 | Andreasson et al. | |
| 2008/0307093 A1* | 12/2008 | Song | H04L 12/12 709/226 |
| 2009/0059828 A1* | 3/2009 | Kubo | H04L 12/12 370/311 |
| 2009/0124301 A1* | 5/2009 | Raissinia | H04W 52/0216 455/574 |
| 2009/0196212 A1* | 8/2009 | Wentink | H04W 52/0235 370/311 |
| 2009/0268652 A1* | 10/2009 | Kneckt | H04W 52/0235 370/311 |
| 2009/0279466 A1* | 11/2009 | Ji | H04W 52/0232 370/311 |
| 2010/0226298 A1 | 9/2010 | Chan et al. | |
| 2010/0265881 A1* | 10/2010 | Shi | H04W 72/1289 370/328 |
| 2011/0002252 A1* | 1/2011 | Kim | H04W 52/0216 370/311 |
| 2011/0019721 A1* | 1/2011 | Diener | H04W 88/02 375/219 |
| 2011/0051655 A1 | 3/2011 | Blankenship et al. | |
| 2011/0205949 A1* | 8/2011 | Maenpaa | H04W 40/005 370/311 |
| 2011/0292812 A1* | 12/2011 | Kim | H04B 17/309 370/242 |
| 2012/0052858 A1* | 3/2012 | Mohseni | H04W 52/0245 455/425 |
| 2012/0094680 A1* | 4/2012 | Stackelius | H04W 72/1242 455/452.1 |
| 2012/0172012 A1* | 7/2012 | Sumcad | H04W 4/12 455/414.1 |
| 2012/0173901 A1 | 7/2012 | Soliman et al. | |
| 2012/0176929 A1* | 7/2012 | Choi | H04W 76/02 370/253 |
| 2012/0282906 A1* | 11/2012 | Frye | H04W 4/04 455/414.2 |
| 2013/0121172 A1* | 5/2013 | Cheng | H04W 52/0222 370/252 |
| 2013/0223312 A1 | 8/2013 | Ai | |
| 2013/0265922 A1 | 10/2013 | Chakravarthy et al. | |
| 2014/0003367 A1* | 1/2014 | Viger | H04W 74/0816 370/329 |

FOREIGN PATENT DOCUMENTS

| | | |
|---|---|---|
| CN | 102365830 A | 2/2012 |
| WO | WO-2011130543 A1 | 10/2011 |
| WO | WO-2012090615 A1 | 7/2012 |

* cited by examiner

METHOD AND APPARATUS FOR MAINTAINING REACHABILITY OF A USER EQUIPMENT IN IDLE STATE

CLAIM OF PRIORITY UNDER 35 U.S.C. § 119

The present application for patent claims priority to Provisional Application No. 61/873,703 filed on Sep. 4, 2013, and assigned to the assignee hereof and hereby expressly incorporated by reference herein.

BACKGROUND

Aspects of the present disclosure relate generally to wireless communication systems, and more particularly, to method and apparatus for maintaining reachability of a user equipment in an idle state.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

In a wireless communication system, a user equipment (UE) may be in communication with a peer entity to support communications between one or more applications installed on the UE and one or more applications installed on the peer entity. In an aspect, tracking the reachability status of the UE in the wireless communication system may play an important role in maintaining communication between the application on UE and the application on the peer entity. If the application of the peer entity sends a reachability status inquiry to the UE while the UE is in an idle state, the UE may transition out of the idle state and into a connected state in order to respond to the reachability status inquiry. The UE may then transition back to the idle state. As a result of the constant transitioning that may occur between connected and idle states due to reachability status inquiries, the UE may experience increased signaling overhead and power consumption. As such, applications on peer entities that require a high frequency of reachability status updates, thereby constantly interrupting the UE's idle operations, may adversely impact the UE performance. Thus, improvements in maintaining reachability of a UE that is in an idle state are desired.

SUMMARY

The following presents a simplified summary of one or more aspects of methods and apparatuses for maintaining reachability of a UE in idle state. This summary is not an extensive overview of all contemplated aspects of the invention, and is intended to neither identify key or critical elements of the invention nor delineate the scope of any or all aspects thereof. Its sole purpose is to present some concepts of one or more aspects in a simplified form as a prelude to the more detailed description that is presented later.

In one aspect, a method for maintaining reachability at a UE is disclosed. In the aspect, the method comprises detecting a change in a radio connection between the UE and a peer entity, wherein the change in the radio connection is associated with the UE entering an idle state. The method further comprises communicating to the peer entity, in response to the change in the radio condition being detected, an indication that the UE is to enter the idle state and that the UE is reachable for a specified duration of time while in the idle state. Additionally, the method comprises entering the idle state after communicating the indication to the peer entity.

In another aspect, a computer program product for maintaining reachability at a UE and comprises a non-transitory computer-readable medium. In the aspect, the computer-readable medium includes code executable by a computer to detect a change in a radio connection between the UE and a peer entity, wherein the change in the radio connection is associated with the UE entering an idle state. The computer-readable medium also includes code executable by the computer to communicate to the peer entity, in response to the change in the radio condition being detected, an indication that the UE is to enter the idle state and that the UE is reachable for a specified duration of time while in the idle state. The computer-readable medium further includes code executable by the computer to enter the idle state after communicating the indication to the peer entity.

In a further aspect, an apparatus for maintaining reachability at a UE is disclosed. In the aspect, the apparatus comprises means for detecting a change in a radio connection between the UE and a peer entity, wherein the change in the radio connection is associated with the UE entering an idle state. Additionally, the apparatus comprises means for communicating to the peer entity, in response to the change in the radio condition being detected, an indication that the UE is to enter the idle state and that the UE is reachable for a specified duration of time while in the idle state. Furthermore, the apparatus comprises means for means for entering the idle state after communicating the indication to the peer entity.

Moreover, in an aspect, an apparatus for maintaining reachability at a UE is disclosed. In the aspect, the apparatus comprises a radio connection change component configured to detect a change in a radio connection between the UE and a peer entity, wherein the change in the radio connection is associated with the UE entering an idle state. The apparatus further comprises an indication communicating component configured to communicate to the peer entity, in response to the change in the radio condition being detected, an indication that the UE is to enter the idle state and that the UE is reachable for a specified duration of time while in the idle state. The apparatus additionally comprises an idle state component configured to cause the UE to enter the idle state after communicating the indication to the peer entity.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
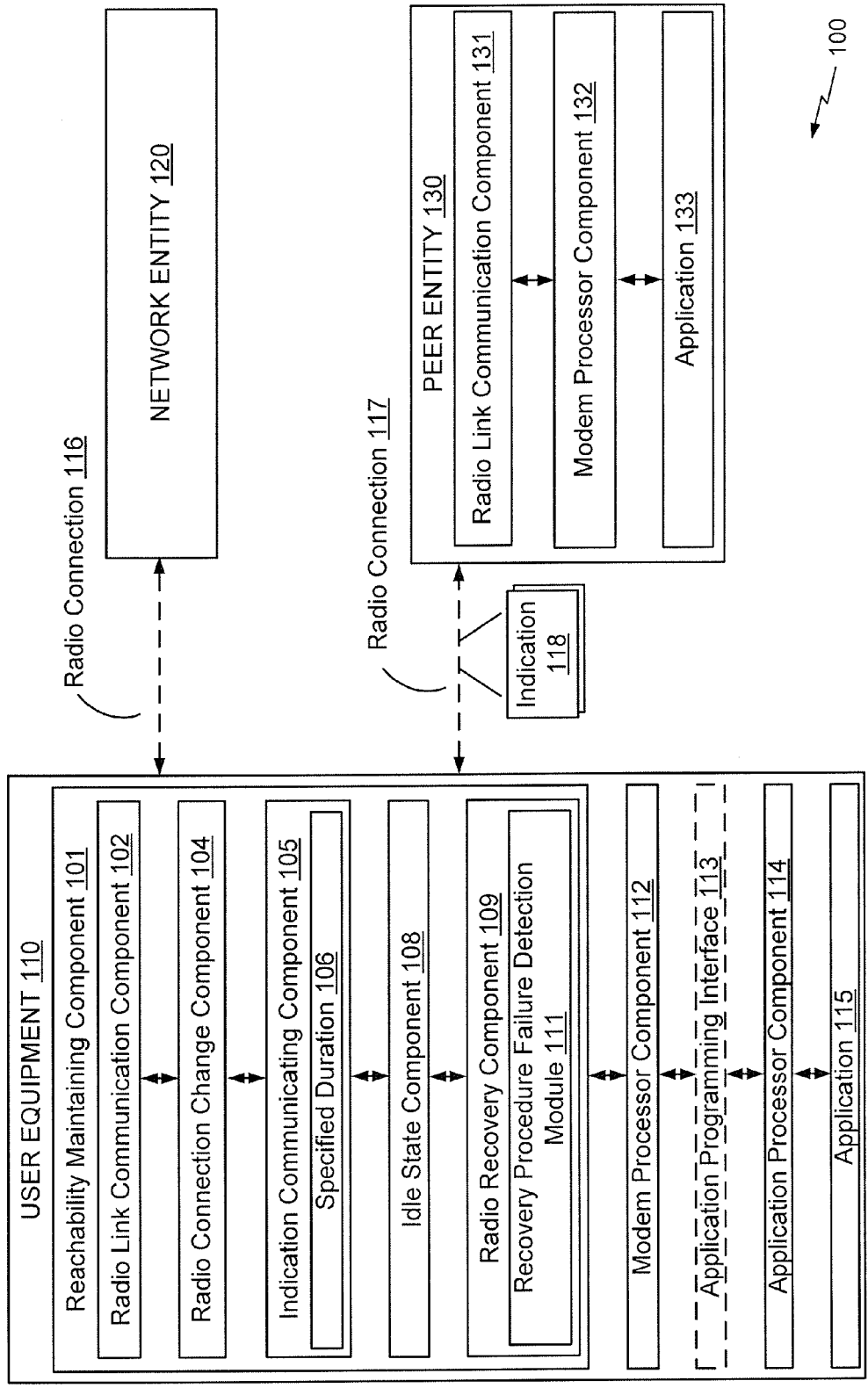
FIG. 1 is a diagram of an aspect of a wireless communication system, including a UE that is configured to maintain reachability in communication with a network entity and a peer entity, as described herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present aspects generally relate to maintaining reachability at a UE. In a wireless communication system, a UE may be in communication with a peer entity to support communications between one or more applications (APPs) installed on the UE and one or more applications installed on the peer entity. In an aspect, tracking the reachability status of the UE in the wireless communication system may play an important role in maintaining communication between the application on UE and the application on the peer entity. As an example, the reachability status of the UE informs applications on other network entities (such as the peer entity) of whether the application on the UE can be reached through the wireless communication system.

In an aspect, if the application of the peer entity sends a reachability status inquiry to the UE while the UE is in an idle state, the UE may transition out of the idle state and into a connected state in order to respond to the reachability status inquiry. As an example, the UE may respond to the peer entity's reachability status inquiry by indicating to the peer entity that the UE is currently reachable in the wireless communication system. After the inquiry is fulfilled, the UE may transition back into the idle state.

As a result of the constant transitioning that may occur between connected and idle states due to reachability status inquiries, the UE may experience increased signaling overhead and/or power consumption. As such, applications on peer entities that require a high frequency of reachability status updates, thereby constantly interrupting the UE's idle operations, may adversely impact the UE performance. Thus, improvements in maintaining reachability of a UE that is in an idle state are desired.

In an aspect, the UE may detect a change in a radio connection between the UE and a peer entity, wherein the change in the radio connection is associated with the UE entering an idle state. In such an aspect, the UE may communicate to the peer entity, in response to the change in the radio condition being detected, an indication that the UE is to enter the idle state and that the UE is reachable for a specified duration of time while in the idle state. Further to the aspect, the UE may then enter the idle state after communicating the indication to the peer entity, thereby enhancing the maintenance of the UE's reachability status while in the idle state. Accordingly, in some aspects, the present apparatus and methods provide an efficient solution, as compared to current solutions, to more effectively maintain reachability of a UE in an idle state.

Referring to FIG. 1, a wireless communication system 100, including a UE 110 in communication with a peer entity 130 and network entity 120, through a network (not shown), that has aspects configured to maintain reachability of the UE 110.

UE 110 also may be referred to as a mobile device, a mobile apparatus, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. UE 110 may also be referred to as an electronic object, an appliance, a sensor, a machine or tool, a piece of equipment, a domestic object, and other like devices that are configured to support and/or perform one or more types of communications (e.g., wireless and/or wired communications, network communications, peer-to-peer communications), as well as being configured to support and/or perform one or more types of operations (e.g., processing operations, sensing operations, data storage operations). In an aspect, peer entity 130 may include a server, a base station, another UE, and/or the like configured to communicate with UE 110 in relation to processing for an application that is installed on the UE 110.

In an aspect, UE 110 and peer entity 130 may be in communication with one another over a network (not shown). Further in an aspect, network entity 120 may be the network that UE 110 and peer entity 130 communicate through. UE 110 and/or peer entity 130 may receive network access via a base station (not shown), which also may be referred to as an access point or node, may be a macro cell, small cell, relay, NodeB, mobile NodeB, UE (e.g., communicating in peer-to-peer or ad-hoc mode with UE 110 and/or peer entity 160), or substantially any type of component that can communicate with UE 110 to provide wireless network access. Alternatively, UE 110 may be in communication with peer entity 130 over a peer to peer connection.

In another aspect, UE 110 may be in communication with network entity 120 through a network (not shown). As an example, UE 110 and network entity 120 may communicate through a wireless communication network such as a UTRAN. In a further aspect, network entity 120 may be at the edge of the network and may be referred to as a base station or a serving cell. Still further, network entity 120 may be a network such as a wireless communication network (e.g., UTRAN) or a core network.

As used herein, the term "small cell" may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a base station (BS), an access point, a femto node, a femtocell, a pico node, a micro node, a Node B, evolved Node B (eNB), home Node B (HNB) or home evolved Node B (HeNB). Therefore, the term "small cell," as used herein, refers to a relatively low transmit power and/or a relatively small coverage area cell as compared to a macro cell.

In an aspect, UE 110 may include reachability maintaining component 101, which may be configured to maintain reachability at UE 110. In another aspect, reachability maintaining component 101 may include radio link communication component 102, which may be configured to handle communications between UE 110 and peer entity 130. Similarly, peer entity 130 may include radio link communication component 131, which may be configured to handle communications between peer entity 130 and UE 110.

In an aspect, radio link communication component 102 of UE 110 may be configured to handle communications between UE 110 and peer entity 130 related to an application installed on UE 110, such as application 115, and an application installed on peer entity 130, such as application 133. In one, non-limiting example, UE 110 may have installed thereon a social networking client-side application and peer entity 130 may be a server with a social networking server-side application. Further to the non-limiting example, the server-side social networking application may seek to frequently acquire (e.g., every few seconds, minutes, or hours) a reachability status of UE 110.

In an alternative aspect, UE 110 may include modem processor component 112, which may be configured to handle communications between UE 110 and peer entity 130 relating to application 113. In the alternative aspect, modem processor 112 of UE 110 may communicate with modem processor component 132 of peer entity 130 over radio connection 117. Further to the alternative aspect, modem processor component 112 may communicate with modem processor component 132 over radio connection through radio link communication component 102 and radio link communication component 131.

In another aspect, reachability maintaining component 101 of UE 110 may include radio connection change component 104, which may be configured to determine that UE 110 is communicating with peer entity 130 in a connected state via radio connection 117. In an aspect, radio connection change component 104 also may be configured to determine that UE 110 is communicating with some other entity in addition to, or instead of, peer entity 130. As an example, radio connection change component 104 may be configured to determine that UE 110 is communicating with network entity 120. In some aspects, the radio connection change component 104 also may be configured to initiate a release of a radio connection.

In a further aspect, radio connection change component 104 also may be configured to detect a change in radio connection, such as radio connection 117 between UE 110 and peer entity 130, wherein the change in radio connection 117 is associated with UE 110 entering an idle state. As an example, radio connection change component 104 may detect that utilization of radio connection 117 between UE 110 and peer entity 130 is less than a threshold. In the example, utilization of radio connection 117 may be overall throughput over radio connection 117, wherein a number of packets that are sent over radio connection 117 is less than a threshold. Further in the example, the threshold may be programmable and may be dynamically varied based on operating conditions.

As another example, radio connection change component 104 may detect that a quality metric of a connection between UE 110 and a serving cell (not shown) is less than a threshold. In the example, the quality metric may be a signal quality metric. Additionally, another aspect, the quality metric may be a signal strength metric. In a further aspect, the quality metric may be a signal to interference plus noise (SINR) ratio. Further in the example, the threshold may be programmable and may be dynamically varied based on operating conditions and/or operating trends detected by radio link communication component 102.

As a further example, radio connection change component 104 may detect that radio connection 117 between UE 110 and peer entity 130 is to be released. In the example, releasing radio connection 117 may include disconnecting the signaling radio bearers (SRBs) and radio resources that are associated with radio connection 117 from the network. Additionally in the example, UE 110 may initiate the release of radio connection 117. The release of radio connection 117 may be due to dormancy of UE 110, UE 110 performing an "Abort Service" Request, or UE 110 entering an "Airplane mode" wherein all radio connections are disabled. Further in the example, a network entity, such as network entity 120, may initiate the release of radio connection 117. Network entity 120 may request that UE 110 release radio connection 117 by tearing down from a radio resource control (RRC) dedicated channel (Cell_DCH) state or from a RRC forward access channel (Cell_FACH) state.

According to an aspect, reachability maintaining component 101 of UE 110 may include indication communicating component 105, which may be configured to communicate to peer entity 130, in response to the change in radio condition 117 being detected by radio connection change component 104, an indication 118 that UE 110 is to enter the idle state and that UE 110 is reachable for a specified duration of time 106 while in the idle state. As an example, indication 118 may be a message field in a packet that is transmitted over radio connection 117. As another example, indication 118 may be one or more flags set in a field. Further in the aspect, indication 118 may further indicate that peer entity 130 is not to attempt to reach UE 110 during specified duration 106 of time.

In an alternative aspect, indication communicating component 105 may provide modem processor component 112 of UE 110 with a notification that UE 110 is to enter the idle state. In the alternative aspect, modem processor component 112 may communicate the notification to application 115 on UE 110 through application processor component 114. As an example, the notification may be may be a message field in a packet or a one or more flags that are set. Further to the alternative aspect, modem processor component 112 may further provide application processor component 114 with application programming interface or API 113 that enables application processor component 114 to invoke the functionality of modem processor component 112 when UE 110 is in the idle state. Still further to the alternative aspect, modem processor component 112 may communicate indication 118 to a modem processor component of peer entity 130, such as modem processor component 132.

According to another aspect, reachability maintaining component 101 of UE 110 may include idle state component 108, which may be configured to cause UE 110 to enter the idle state after indication 118 has been communicated to peer entity 130 over radio connection 117.

In a further aspect, reachability maintaining component 101 of UE 110 may include radio recovery component 109, which may be configured to initiate a recovery procedure in response to radio connection change component 104 detecting that the quality metric of the connection between UE 110 and the serving cell is less than the threshold. In the aspect, radio recovery component 109 may include recovery procedure failure detection module 111, which may be configured to determine whether the radio recovery procedure has failed. Various radio link failure criteria and actions upon radio link failure are described in 3GPP TS25.331 section 8.5.6, the contents of which are incorporated herein by reference. For example, when in the Cell_DCH state, a failure in the radio recovery procedure (e.g., radio link failure) may result when a number of consecutive "out of sync" indications are received from layer 1 for the established Dedicated Physical Control Channel (DPCCH) or Fractional Dedicated Physical Channel (F-DPCH) on the downlink frequency associated with the primary uplink frequency in frequency division duplexing (FDD). In such cases, a timer may be started and after receiving a number of successive "in sync" indications on the downlink frequency and upon change of the UE state, the timer may be stop and reset. Otherwise, expiration of the timer may be considered a radio link failure.

Further in the aspect, if recovery procedure failure detection module 111 determines that the radio recovery procedure has failed, radio recovery component 109 may notify idle state component 108 of the failure. Idle state component 108 may then cause UE 110 to enter the idle state in response to the determination that the radio recovery procedure has failed. UE 110 may then enter idle state and be reachable while in idle state for a specified duration of time.

Figure 2:
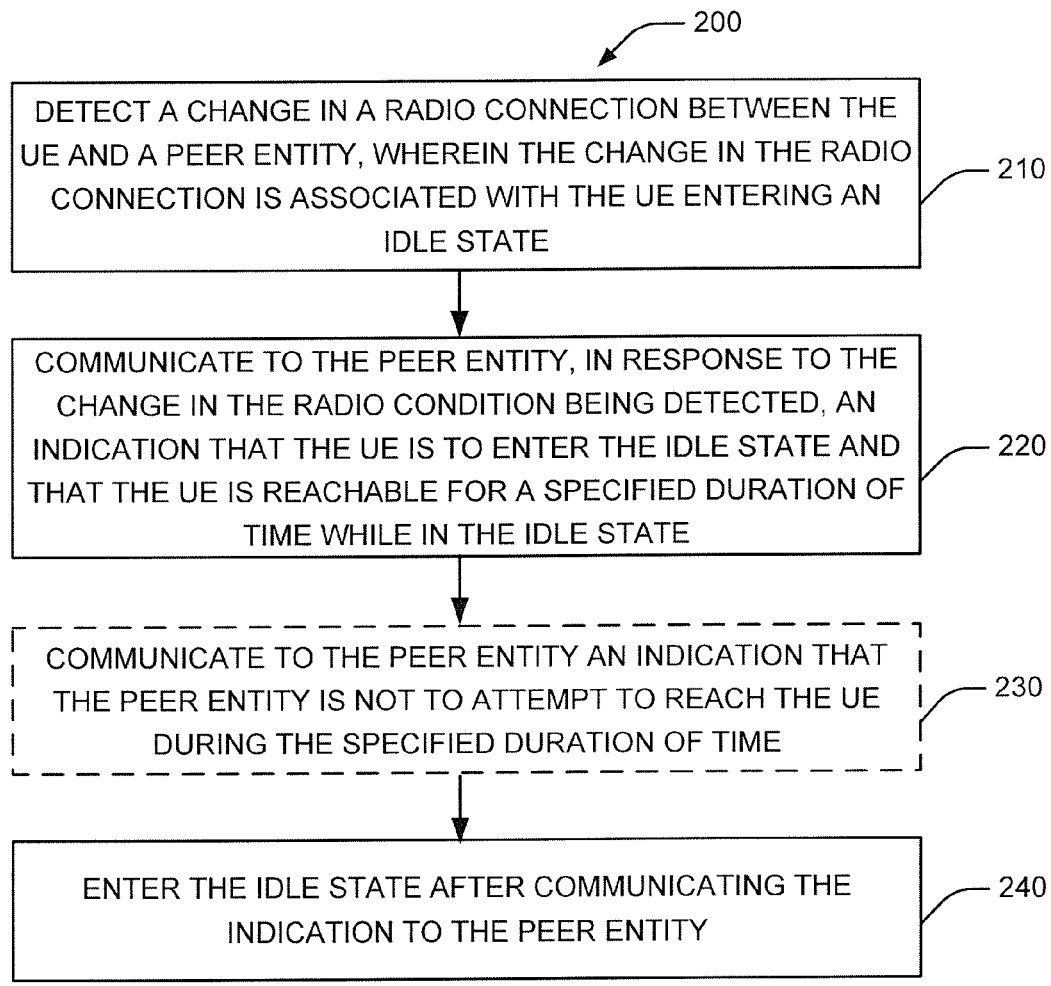
FIG. 2 is a flow chart of an aspect of a method for maintaining reachability at a UE, as described herein.

Referring to FIG. 2, aspects of a method 200 for maintaining reachability of a UE may be performed by UE 110 of FIG. 1. UE 110 may be in communication with a peer entity, such as peer entity 130 of FIG. 1, wherein application 115 of UE 110 communicates with application 133 of peer entity 130 over a radio connection such as radio connection 117 of FIG. 1.

At 210, the method 200 may include detecting a change in a radio connection between the UE and a peer entity, wherein the change in the radio connection is associated with the UE entering an idle state. For example, radio connection change component 104 of reachability maintaining component 101 may be configured to detect a change in radio connection 117 between UE 110 and peer entity 130, wherein the change in radio connection 117 is associated with UE 110 entering an idle state. In an aspect, the change in radio connection 117 may be that utilization of radio connection 117 is less than a threshold. As an example, utilization of radio connection 117 may be less than a threshold as a result of inactivity on radio connection 117. In a further example, utilization of radio connection 117 may be less than a threshold as a result of a data session expiration between UE 110 and peer entity 130.

In another aspect, the change in radio connection 117 may be that a quality metric of a connection between UE 110 and a serving cell is less than a threshold. In a further aspect, the change in radio connection 117 may be that radio connection 117 between UE 110 and peer entity 130 is to be released. As an example, releasing radio connection 117 may include disconnecting the signaling radio bearers (SRBs) and radio resources that are associated with radio connection 117 from the network.

In the aspect, UE 110 may initiate the release of radio connection 117. As an example, UE 110 may initiate the release of radio connection 117 due to dormancy of UE 110, UE 110 performing an "Abort Service" Request, or UE 110 entering an "Airplane mode" wherein all radio connections are disabled. As an alternative in the aspect, a network entity, such as network entity 120, may also initiate the release of radio connection 117 in the further aspect. As an example, network entity 120 may request that UE 110 tears down from a radio resource control (RRC) dedicated channel (Cell_DCH) state or from a RRC forward access channel (Cell_FACH) state.

At 220, the method 200 may include communicating to the peer entity, in response to the change in the radio condition being detected, an indication that the UE is to enter the idle state and that the UE is reachable for a specified duration of time while in the idle state. For example, indication communicating component 105 of UE 110 may be configured to communicate to peer entity 130, in response to radio connection change component 104 detecting the change in radio connection 117, an indication (e.g., indication 118) that UE 110 is to enter the idle state and that UE 110 is reachable for a specified duration (e.g., specified duration 106) of time while in the idle state.

In an aspect, indication 118 may be communicated to a modem processor (e.g., modem processor component 132) of peer entity 130 from a modem processor (e.g., modem processor component 112) of UE 110. In another aspect, modem processor component 112 of UE 110 may provide a notification to application 115 that UE 110 is to enter the idle state. In the alternative aspect, modem processor component 112 may communicate the notification to application 115 on UE 110 through application processor component 114. As an example, the notification may be may be a message field in a packet or a one or more flags that are set. Further to the aspect, the modem processor may provide the application processor with an application programming interface, such as application programming interface 113. In the aspect, application programming interface 114 enables the application processor to invoke the functionality of the modem processor when UE 110 is in the idle state.

At 230, the method 200 may optionally include communicating to the peer entity a second indication 118 that the peer entity is not to attempt to reach the UE during the specified duration of time. As an example, indication communicating component 105 of UE 110 may communicate to peer entity 130 indication 118 that peer entity 130 is not to attempt to reach UE 110 during the specified duration 106 of time. The indication that peer entity 130 not attempt to reach UE 110 may result when, for example, the radio condition continues to be healthy, but the radio network or the mobile device (e.g., UE 110) may decide to tear down the radio connection due to various normal reasons, which may include inactivity, data session expiration, or dormancy of the mobile device, to name a few. Thus, in some aspects, the peer entity 130 (e.g., the radio link communication component 131) may receive a first indication that the UE 110 is to enter an idle state and that the UE 110 is reachable for a specified duration of time while in the idle state. The peer entity 130 (e.g., the radio link communication component 131) may reach, contact, or communicate with the UE 110 during the specified duration of time in response to the first indication. In other aspects, the peer entity 130 (e.g., the radio link communication component 131) may receive a second indication from the UE 110 that the peer entity 130 is not to attempt to reach the UE 110 during the specified duration of time and, therefore, the peer entity 130 (e.g., the radio link communication component 131) may refrain from reaching the UE 110 during the specified duration of time in response to the second indication.

At 240, the method 200 may include entering the idle state after communicating the indication to the peer entity. As an example, idle state component 108 may cause UE 110 to enter the idle state after indication communicating component 105 has communicated indication 118 to peer entity 130.

Figure 3:
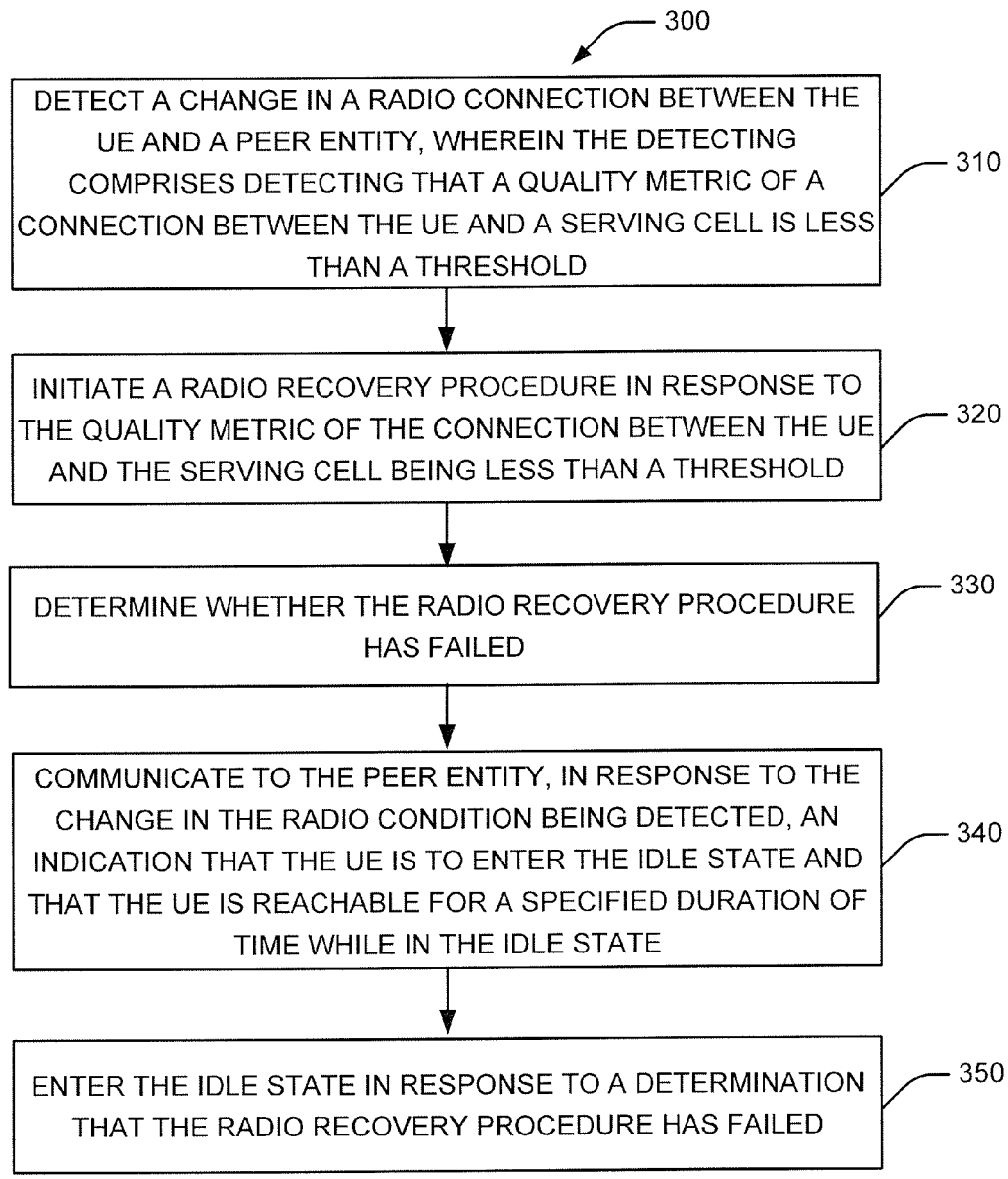
FIG. 3 is a flow chart of another aspect of a method for maintaining reachability at a UE, as described herein.

Referring to FIG. 3, aspects of another method 300 for maintaining reachability of a UE may be performed by UE 110 of FIG. 1. UE 110 may be in communication with a peer entity, such as peer entity 130 of FIG. 1, wherein application 115 of UE 110 communicates with application 133 of peer entity 130 over a radio connection such as radio connection 117 of FIG. 1.

At 310, the method 300 may include detecting a change in a radio connection between the UE and a peer entity, wherein the detecting comprises detecting that a quality metric of a connection between the UE and a serving cell is less than a threshold. As an example, radio connection change component 104 of reachability maintaining component 101 may detect that a quality metric of a connection between UE 110 and a serving cell is less than a threshold. In an aspect, the quality metric may be a signal quality metric. In another aspect, the quality metric may be a signal strength metric. In a further aspect, the quality metric may be a signal to interference plus noise (SINR) ratio.

At 320, the method 300 may include initiating a radio recovery procedure in response to the quality metric of the connection between the UE and the serving cell being less than the threshold. As an example, radio recovery component 109 of UE 110 may initiate a radio recovery procedure in response to radio connection change component 104 detecting that the quality metric of the connection between UE 110 and the serving cell being less than the threshold.

At 330, the method 300 may include determining whether the radio recovery procedure has failed (various radio link failure criteria and actions upon radio link failure are described in 3GPP TS25.331 section 8.5.6). As an example, radio recovery component 109 of UE 110 may determine whether the radio recovery procedure has failed.

At 340, the method 300 may include communicating to the peer entity, in response to the change in the radio condition being detected, an indication that the UE is to enter the idle state and that the UE is reachable for a specified duration of time while in the idle state. For example, indication communicating component 105 of UE 110 may be configured to communicate to peer entity 130, in response to radio connection change component 104 detecting the change in radio connection 117, indication 118 that UE 110 is to enter the idle state and that UE 110 is reachable for a specified duration 106 of time while in the idle state.

At 350, the method 300 may include entering the idle state in response to a determination that the radio recovery has failed. As an example, idle state component 108 may cause UE 110 to enter the idle state in response to recovery procedure failure detection module 110 of radio recovery component 109 determining that the radio recovery procedure has failed.

Figure 4:
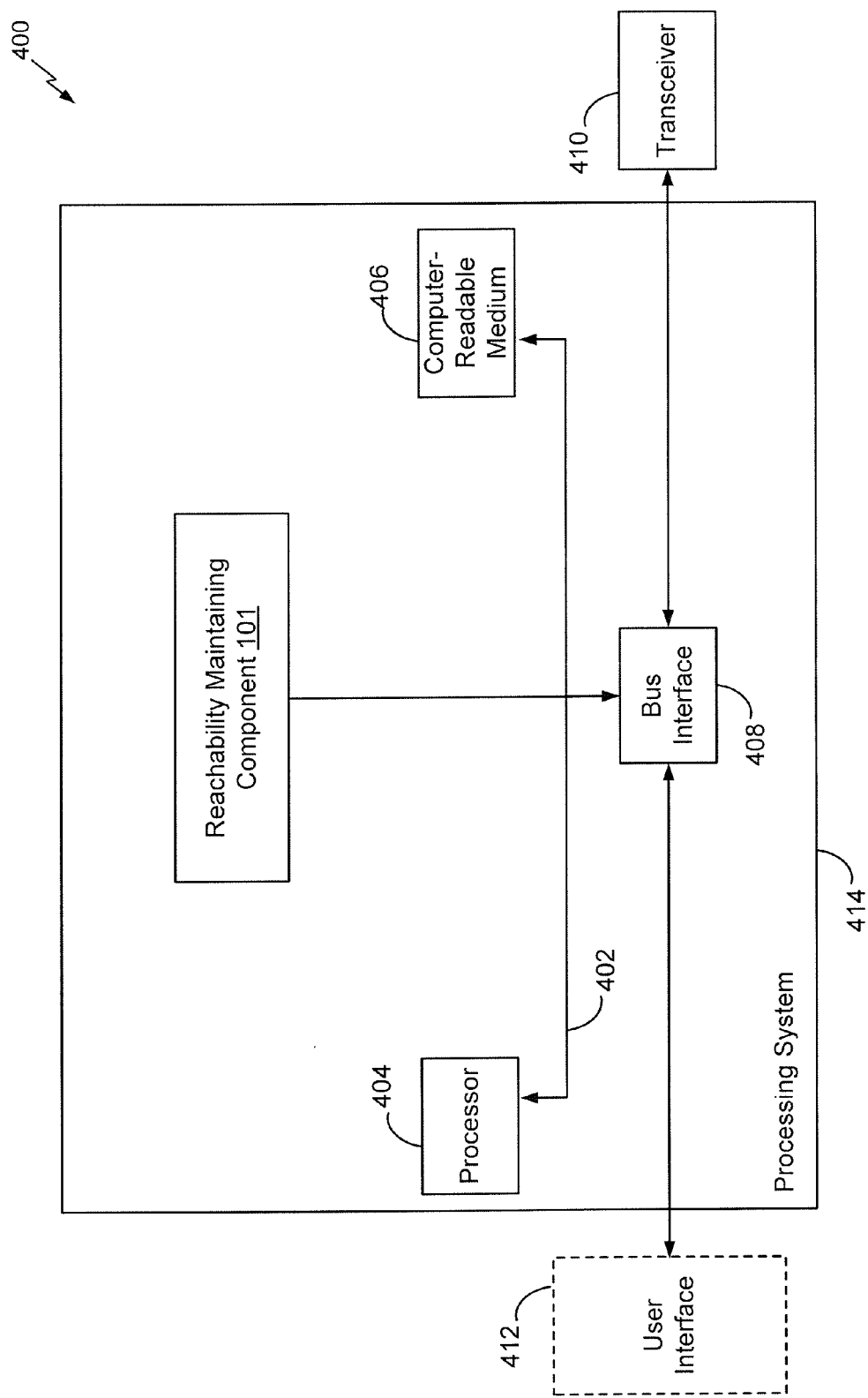
FIG. 4 is a block diagram illustrating an example of a hardware implementation for an apparatus employing a processing system including functionality to maintain reachability at a UE, as described herein.

FIG. 4 is a block diagram illustrating an example of a hardware implementation for an apparatus 400 employing a processing system 414 having aspects con figured to maintain reachability of a UE. The apparatus 400 employing processing system 414 may be UE 110, network entity 120, and/or peer entity 130, all of FIG. 1. In this example, the processing system 414 may be implemented with a bus architecture, represented generally by the bus 402. The bus 402 may include any number of interconnecting buses and bridges depending on the specific application of the processing system 414 and the overall design constraints. The bus 402 links together various circuits including one or more processors, represented generally by the processor 404, and computer-readable media, represented generally by the computer-readable medium 406. In an aspect, the bus 402 also links together one or more components of UE 110 and/or reachability maintaining component 101, as described herein with respect to FIG. 1. In another aspect, the bus 402 may also link together one or more components of peer entity 130 as described herein with respect to FIG. 1. In a further aspect, rather than being a separate entity, the functions performed by reachability maintaining component may be implemented by processor 404 operating in conjunction with memory 404 and/or computer-readable medium 406.

The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 provides a means for communicating with various other apparatus over a transmission medium. Depending upon the nature of the apparatus, a user interface 412 (e.g., keypad, display, speaker, microphone, joystick) may also be provided.

The processor 404 is responsible for managing the bus 402 and general processing, including the execution of software stored on the computer-readable medium 406. The software, when executed by the processor 404, causes the processing system 414 to perform the various functions described infra for any particular apparatus. The computer-readable medium 406 may also be used for storing data that is manipulated by the processor 404 when executing software.

Figure 5:
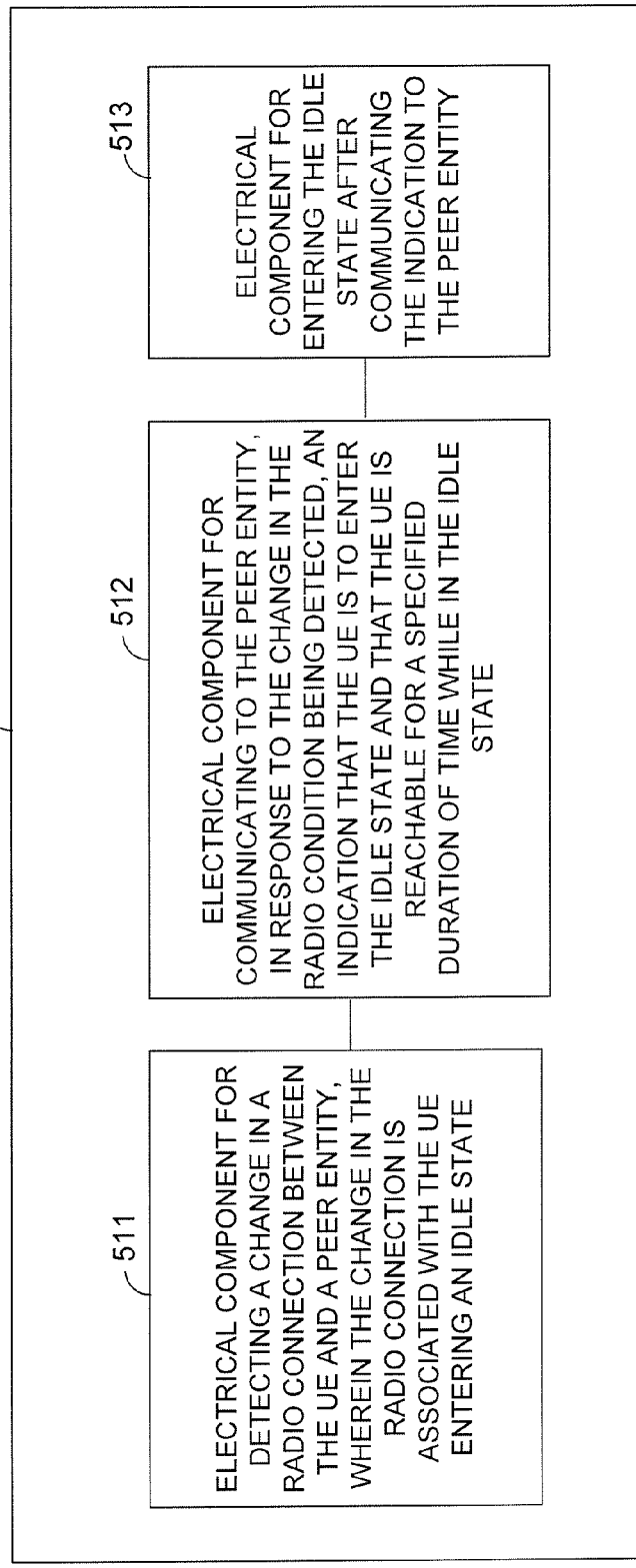
FIG. 5 is a block diagram illustrating an example apparatus for maintaining reachability at a UE according to one aspect, as described herein.

FIG. 5 illustrates a system 500 for maintaining reachability at a UE based on the principles disclosed herein. For example, system 500 can be implemented in UE 110 of FIG. 1. It is to be appreciated that system 500 is represented as including functional blocks, which can be functional blocks that represent functions implemented by a processor, software, or combination thereof (e.g., firmware). System 500 includes a logical grouping 510 of electrical components that can act in conjunction. For instance, logical grouping 510 may include an electrical component 511 for detecting a change in a radio connection between the UE and a peer entity, wherein the change in the radio connection is associated with the UE entering an idle state. Further, logical grouping 510 may comprise an electrical component 512 for communicating to the peer entity, in response to the change in the radio condition being detected, an indication that the UE is to enter the idle state and that the UE is reachable for a specified duration of time while in the idle state. Additionally, logical grouping 500 may include an electrical component 513 for entering the idle state after communicating the indication to the peer entity.

Additionally, system 500 can include a memory 520 that retains instructions for executing functions associated with the electrical components 511-513. In an aspect, memory 520 may include a computer-readable medium (e.g., non-transitory computer-readable medium) such as computer-readable medium 406 of FIG. 4. In another aspect, memory 520 may be incorporated into a processor such as processor 404 of FIG. 4. While shown as being external to memory 520, it is to be understood that one or more of the electrical components 511-513 can exist within memory 520. In one example, electrical components 511-513 can comprise at least one processor, or each electrical component 511-613 can be a corresponding module of at least one processor, such as processor 404 of FIG. 4. Moreover, in an additional or alternative example, electrical components 511-513 can be a computer program product comprising a computer-readable medium, such as computer-readable medium 406 of FIG. 4, where each electrical component 511-513 can be corresponding code.

Figure 6:
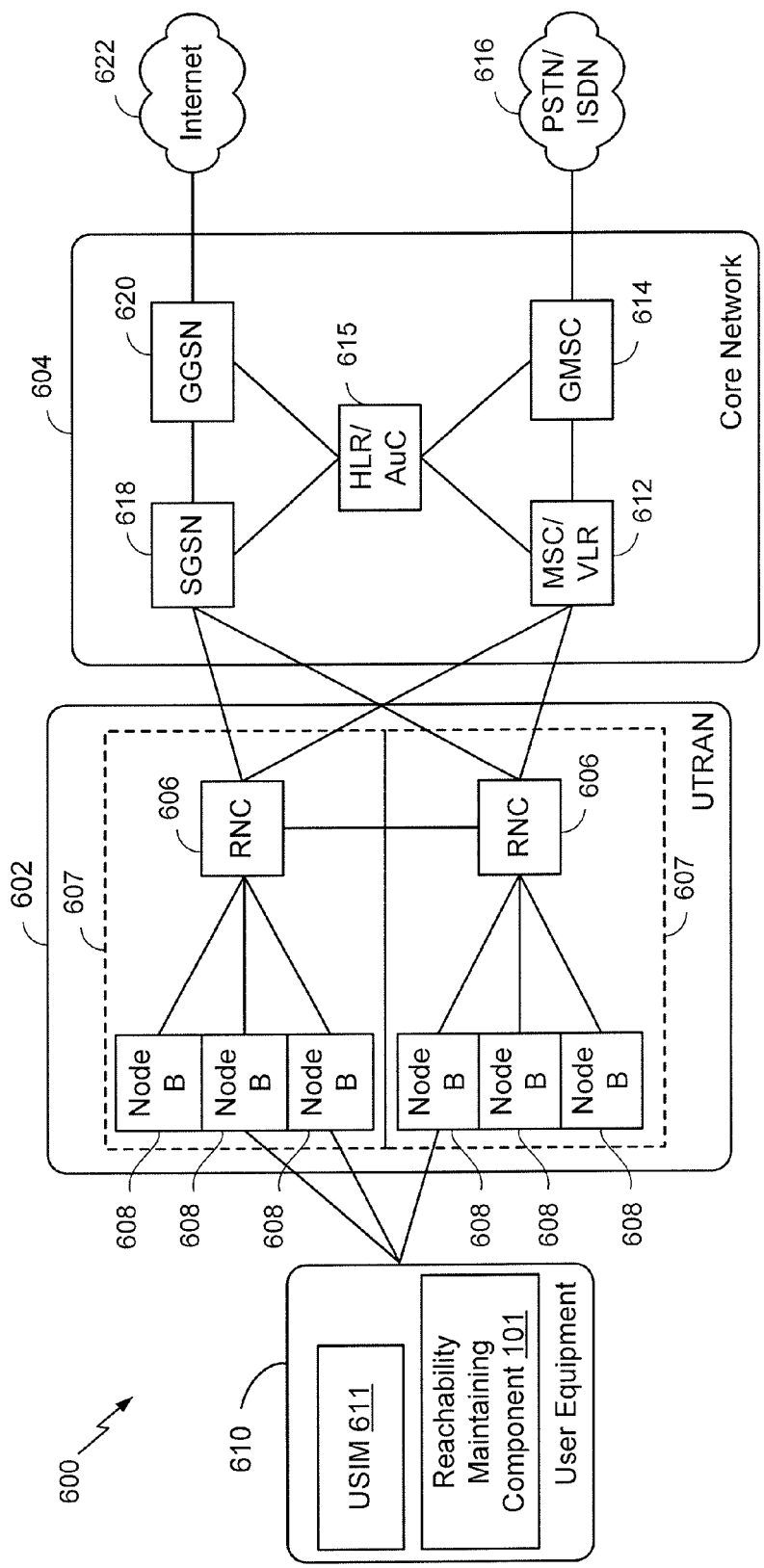
FIG. 6 is a block diagram conceptually illustrating an example of a telecommunications system including the UE of FIG. 1.

The various concepts presented throughout this disclosure may be implemented across a broad variety of telecommunication systems, network architectures, and communication standards. By way of example and without limitation, the aspects of the present disclosure illustrated in FIG. 6 are presented with reference to a UMTS system 600 employing a W-CDMA air interface and having aspects configured to maintain reachability of a UE.

A UMTS network includes three interacting domains: a Core Network (CN) 604, a UMTS Terrestrial Radio Access Network (UTRAN) 602, and User Equipment (UE) 610. In this example, the UTRAN 602 provides various wireless services including telephony, video, data, messaging, broadcasts, and/or other services. The UTRAN 602 may include a plurality of Radio Network Subsystems (RNSs) such as an RNS 607, each controlled by a respective Radio Network Controller (RNC) such as an RNC 606. Here, the UTRAN 602 may include any number of RNCs 606 and RNSs 607 in addition to the RNCs 606 and RNSs 607 illustrated herein. The RNC 606 is an apparatus responsible for, among other things, assigning, reconfiguring and releasing radio resources within the RNS 607. The RNC 606 may be interconnected to other RNCs (not shown) in the UTRAN 602 through various types of interfaces such as a direct physical connection, a virtual network, or the like, using any suitable transport network.

Communication between a UE 610 (e.g., UE 110 that includes reachability maintaining component 101 and/or peer entity 130, of FIG. 1) and a NodeB 608 (e.g., network entity 120, and/or a base station configured to provide wireless communication between UE 110 and network entity 120 or UE 110 and peer entity 130, all of FIG. 1) may be considered as including a physical (PHY) layer and a medium access control (MAC) layer. Further, communication between a UE 610 and an RNC 606 by way of a respective NodeB 608 may be considered as including a radio resource control (RRC) layer. In the instant specification, the PHY layer may be considered layer 1; the MAC layer may be considered layer 2; and the RRC layer may be considered layer 3. Information provided below utilizes terminology introduced in the RRC Protocol Specification, 3GPP TS 25.331 v9.1.0, incorporated herein by reference.

The geographic region covered by the RNS 607 may be divided into a number of cells, with a radio transceiver apparatus serving each cell. A radio transceiver apparatus is commonly referred to as a NodeB in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three NodeBs 608 are shown in each RNS 607; however, the RNSs 607 may include any number of wireless NodeBs. The NodeBs 608 provide wireless access points to a CN 604 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 610 may further include a universal subscriber identity module (USIM) 611, which contains a user's subscription information to a network. For illustrative purposes, one UE 610 is shown in communication with a number of the NodeBs 608. The DL, also called the forward link, refers to the communication link from a NodeB 608 to a UE 610, and the UL, also called the reverse link, refers to the communication link from a UE 610 to a NodeB 608.

The CN 604 interfaces with one or more access networks, such as the UTRAN 402. As shown, the CN 604 is a GSM core network. However, as those skilled in the art will recognize, the various concepts presented throughout this disclosure may be implemented in a RAN, or other suitable access network, to provide UEs with access to types of CNs other than GSM networks.

The CN 604 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 604 supports circuit-switched services with a MSC 612 and a GMSC 614. In some applications, the GMSC 614 may be referred to as a media gateway (MGW). One or more RNCs, such as the RNC 606, may be connected to the MSC 612. The MSC 612 is an apparatus that controls call setup, call routing, and UE mobility functions. The MSC 612 also includes a VLR that contains subscriber-related information for the duration that a UE is in the coverage area of the MSC 612. The GMSC 614 provides a gateway through the MSC 612 for the UE to access a circuit-switched network 616. The GMSC 614 includes a home location register (HLR) 615 containing subscriber data, such as the data reflecting the details of the services to which a particular user has subscribed. The HLR is also associated with an authentication center (AuC) that contains subscriber-specific authentication data. When a call is received for a particular UE, the GMSC 614 queries the HLR 615 to determine the UE's location and forwards the call to the particular MSC serving that location.

The CN 604 also supports packet-data services with a serving GPRS support node (SGSN) 618 and a gateway GPRS support node (GGSN) 620. GPRS, which stands for General Packet Radio Service, is designed to provide packet-data services at speeds higher than those available with standard circuit-switched data services. The GGSN 620 provides a connection for the UTRAN 602 to a packet-based network 622. The packet-based network 622 may be the Internet, a private data network, or some other suitable packet-based network. The primary function of the GGSN 620 is to provide the UEs 610 with packet-based network connectivity. Data packets may be transferred between the GGSN 620 and the UEs 610 through the SGSN 618, which performs primarily the same functions in the packet-based domain as the MSC 612 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudo-random bits called chips. The "wideband" W-CDMA air interface for UMTS is based on such direct sequence spread spectrum technology and additionally calls for a frequency division duplexing (FDD). FDD uses a different carrier frequency for the UL and DL between a NodeB 608 and a UE 610. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 610 provides feedback to the NodeB 608 over the HS-DPCCH to indicate whether it correctly decoded a packet on the downlink.

HS-DPCCH further includes feedback signaling from the UE 610 to assist the NodeB 608 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the NodeB 608 and/or the UE 610 may have multiple antennas supporting MIMO technology. The use of MIMO technology enables the NodeB 608 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multi-path fading and increase transmission quality, and spatial multiplexing gains to increase data throughput.

Spatial multiplexing may be used to transmit different streams of data simultaneously on the same frequency. The data steams may be transmitted to a single UE 610 to increase the data rate or to multiple UEs 610 to increase the overall system capacity. This is achieved by spatially precoding each data stream and then transmitting each spatially precoded stream through a different transmit antenna on the downlink. The spatially precoded data streams arrive at the UE(s) 610 with different spatial signatures, which enables each of the UE(s) 610 to recover the one or more the data streams destined for that UE 610. On the uplink, each UE 610 may transmit one or more spatially precoded data streams, which enables the NodeB 608 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 7:
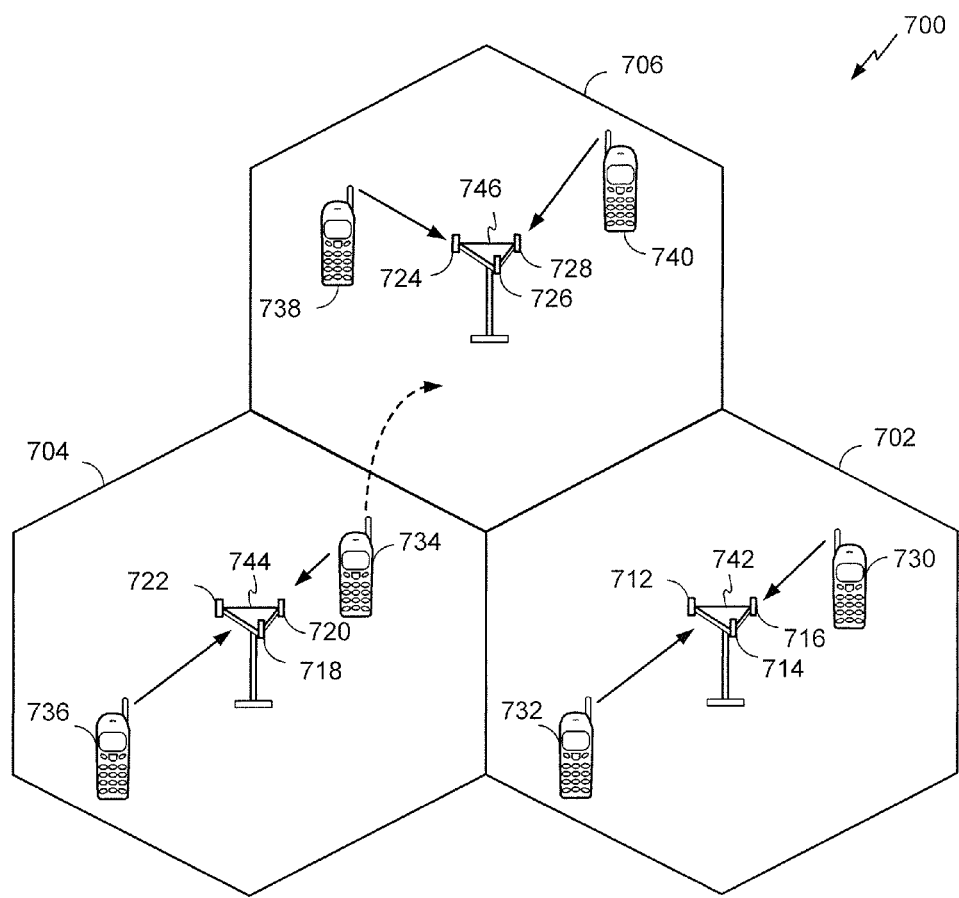
FIG. 7 is a conceptual diagram illustrating an example of an access network including the UE of FIG. 1.

Referring to FIG. 7, an access network 700 in a UTRAN architecture having aspects configured to maintain reachability of a UE, is illustrated. The multiple access wireless communication system includes multiple cellular regions (cells), including cells 702, 704, and 706, each of which may include one or more sectors. The multiple sectors can be formed by groups of antennas with each antenna responsible for communication with UEs in a portion of the cell. For example, in cell 702, antenna groups 712, 714, and 716 may each correspond to a different sector. In cell 704, antenna groups 718, 720, and 722 each correspond to a different sector. In cell 706, antenna groups 724, 726, and 728 each correspond to a different sector. The cells 702, 704 and 706 may include several wireless communication devices, e.g., User Equipment or UEs, which may be in communication with one or more sectors of each cell 702, 704 or 706. For example, UEs 730 and 732 may be in communication with NodeB 742, UEs 734 and 736 may be in communication with NodeB 744, and UEs 738 and 740 can be in communication with NodeB 746. Here, each NodeB 742, 744, 746 is configured to provide an access point to a CN 604 (see FIG. 6) for all the UEs 730, 732, 734, 736, 738, 740 in the respective cells 702, 704, and 706. UEs 730, 732, 734, 736, 738, and 740 may be UE 110 and/or peer entity 130 of FIG. 1. NodeBs 742, 744, and 746 may be a base station configured to provide wireless communication between UE 110, network entity 120, and peer entity 130, all of FIG. 1.

As the UE 734 moves from the illustrated location in cell 704 into cell 706, a serving cell change (SCC) or handover may occur in which communication with the UE 734 transitions from the cell 704, which may be referred to as the source cell, to cell 706, which may be referred to as the target cell. Management of the handover procedure may take place at the UE 734, at the NodeBs corresponding to the respective cells, at a radio network controller 606 (see FIG. 6), or at another suitable node in the wireless network. For example, during a call with the source cell 704, or at any other time, the UE 734 may monitor various parameters of the source cell 704 as well as various parameters of neighboring cells such as cells 706 and 702. Further, depending on the quality of these parameters, the UE 734 may maintain communication with one or more of the neighboring cells. During this time, the UE 734 may maintain an Active Set, that is, a list of cells that the UE 734 is simultaneously connected to (i.e., the UTRA cells that are currently assigning a downlink dedicated physical channel DPCH or fractional downlink dedicated physical channel F-DPCH to the UE 734 may constitute the Active Set).

The modulation and multiple access scheme employed by the access network 500 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 8.

Figure 8:
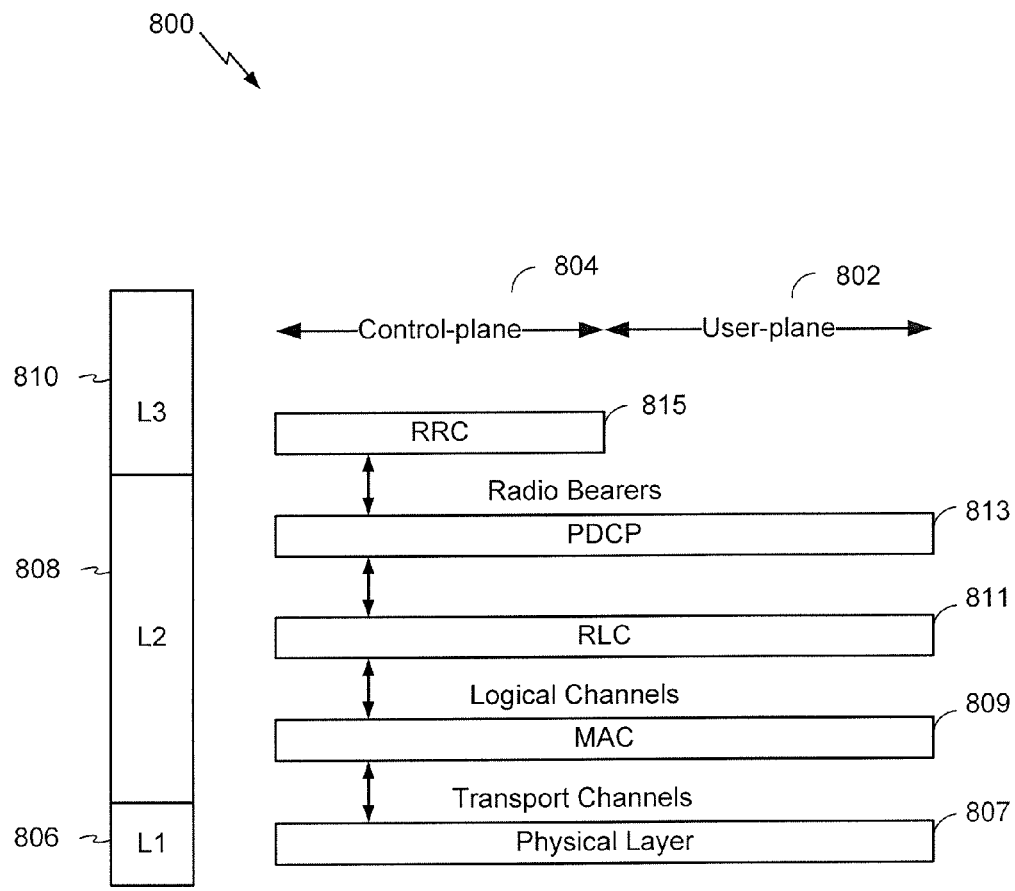
FIG. 8 is a conceptual diagram illustrating an example of a radio protocol architecture for the user and control plane that may be utilized by the UE of FIG. 1.

Referring to FIG. 8 an example radio protocol architecture 800 relates to the user plane 802 and the control plane 804 of a NodeB/base station (e.g., a base station configured to provide wireless communication between UE 110 and peer entity 130, or UE 110 and network entity 120, all of FIG. 1) or a UE (e.g., UE 110 and/or peer entity 130 of FIG. 1) having aspects configured to maintain reachability of the UE. The radio protocol architecture 800 for the UE and NodeB is shown with three layers: Layer 1 806, Layer 2 808, and Layer 3 810. Layer 1 806 is the lowest lower and implements various physical layer signal processing functions. As such, Layer 1 806 includes the physical layer 807. Layer 2 (L2 layer) 808 is above the physical layer 807 and is responsible for the link between the UE and NodeB over the physical layer 807. Layer 3 (L3 layer) 810 includes a radio resource control (RRC) sublayer 815. The RRC sublayer 815 handles the control plane signaling of Layer 3 between the UE and the UTRAN.

In the user plane, the L2 layer 808 includes a media access control (MAC) sublayer 809, a radio link control (RLC) sublayer 811, and a packet data convergence protocol (PDCP) 813 sublayer, which are terminated at the NodeB on the network side. Although not shown, the UE may have several upper layers above the L2 layer 808 including a network layer (e.g., IP layer) that is terminated at a PDN gateway on the network side, and an application layer that is terminated at the other end of the connection (e.g., far end UE, server, etc.).

The PDCP sublayer 813 provides multiplexing between different radio bearers and logical channels. The PDCP sublayer 813 also provides header compression for upper layer data packets to reduce radio transmission overhead, security by ciphering the data packets, and handover support for UEs between NodeBs. The RLC sublayer 811 provides segmentation and reassembly of upper layer data packets, retransmission of lost data packets, and reordering of data packets to compensate for out-of-order reception due to hybrid automatic repeat request (HARQ). The MAC sublayer 809 provides multiplexing between logical and transport channels. The MAC sublayer 809 is also responsible for allocating the various radio resources (e.g., resource blocks) in one cell among the UEs. The MAC sublayer 809 is also responsible for HARQ operations.

Figure 9:
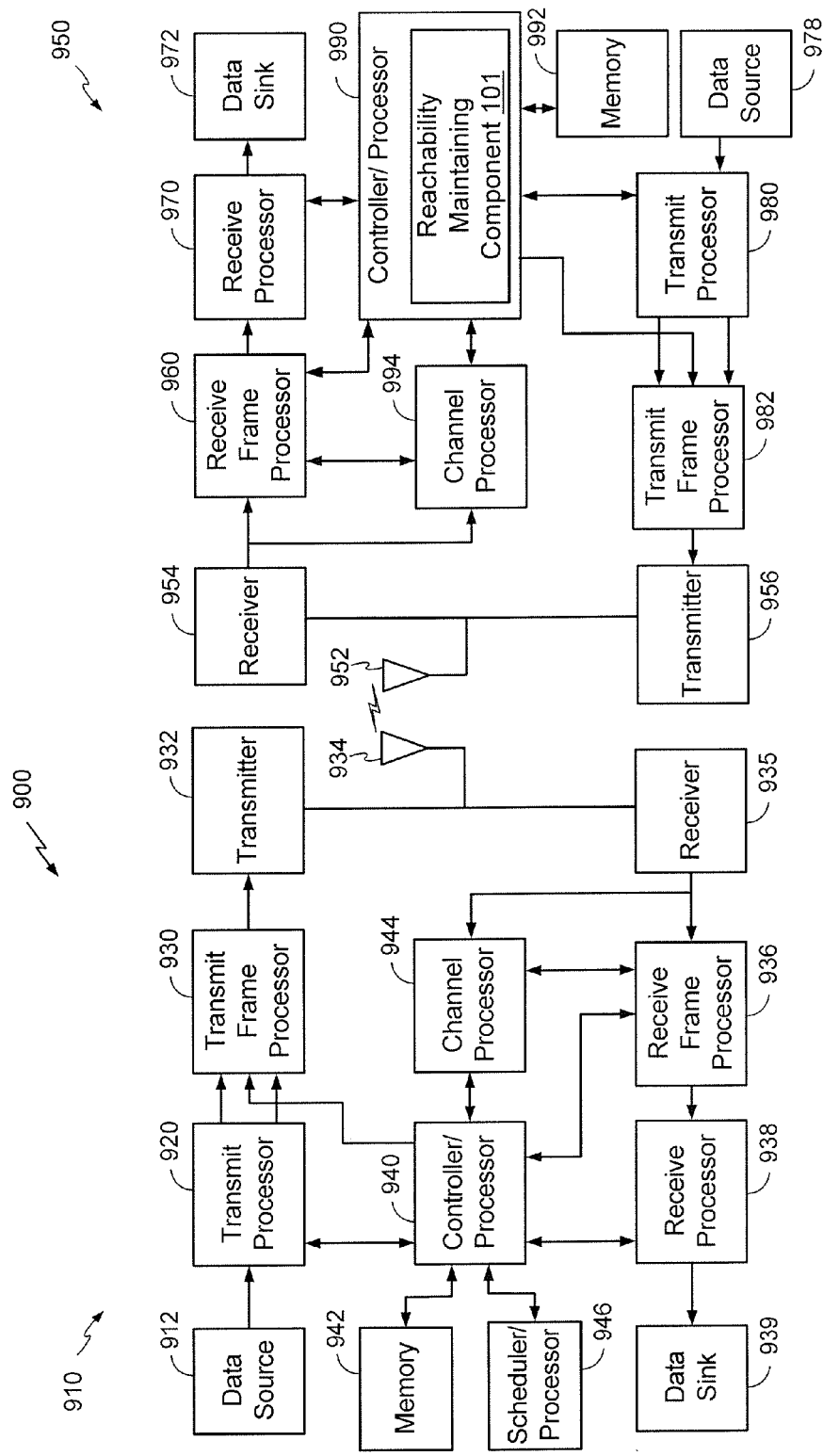
FIG. 9 is a block diagram conceptually illustrating an example of a Node B in communication with a UE, such as the UE of FIG. 1, in a telecommunications system.

FIG. 9 is a block diagram of a NodeB 910 in communication with a UE 950 having aspects configured to maintain reachability of UE 950. In an aspect, NodeB 910 may be the NodeB 608 of FIG. 6, network entity 120 of FIG. 1, and/or a base station configured to provide wireless communication between UE 110 and peer entity 130 of FIG. 1, and the UE 950 may be the UE 610 in FIG. 6, UE 110 of FIG. 1, and/or peer entity 130 of FIG. 1. In the downlink communication, a transmit processor 920 may receive data from a data source 912 and control signals from a controller/processor 940. The transmit processor 920 provides various signal processing functions for the data and control signals, as well as reference signals (e.g., pilot signals). For example, the transmit processor 920 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 944 may be used by a controller/processor 940 to determine the coding, modulation, spreading, and/or scrambling schemes for the transmit processor 920. These channel estimates may be derived from a reference signal transmitted by the UE 950 or from feedback from the UE 950. The symbols generated by the transmit processor 920 are provided to a transmit frame processor 930 to create a frame structure. The transmit frame processor 930 creates this frame structure by multiplexing the symbols with information from the controller/processor 940, resulting in a series of frames. The frames are then provided to a transmitter 932, which provides various signal conditioning functions including amplifying, filtering, and modulating the frames onto a carrier for downlink transmission over the wireless medium through antenna 934. The antenna 934 may include one or more antennas, for example, including beam steering bidirectional adaptive antenna arrays or other similar beam technologies.

At the UE 950, a receiver 954 receives the downlink transmission through an antenna 952 and processes the transmission to recover the information modulated onto the carrier. The information recovered by the receiver 954 is provided to a receive frame processor 960, which parses each frame, and provides information from the frames to a channel processor 994 and the data, control, and reference signals to a receive processor 970. The receive processor 970 then performs the inverse of the processing performed by the transmit processor 920 in the NodeB 910. More specifically, the receive processor 970 descrambles and despreads the symbols, and then determines the most likely signal constellation points transmitted by the NodeB 910 based on the modulation scheme. These soft decisions may be based on channel estimates computed by the channel processor 994. The soft decisions are then decoded and deinterleaved to recover the data, control, and reference signals. The CRC codes are then checked to determine whether the frames were successfully decoded. The data carried by the successfully decoded frames will then be provided to a data sink 972, which represents applications running in the UE 950 and/or various user interfaces (e.g., display). Control signals carried by successfully decoded frames will be provided to a controller/processor 990. In an aspect, UE 950 may include a controller/processor that may include reachability maintaining component 101. When frames are unsuccessfully decoded by the receiver processor 970, the controller/processor 990 may also use an acknowledgement (ACK) and/or negative acknowledgement (NACK) protocol to support retransmission requests for those frames.

In the uplink, data from a data source 978 and control signals from the controller/processor 990 are provided to a transmit processor 980. The data source 978 may represent applications running in the UE 950 and various user interfaces (e.g., keyboard). Similar to the functionality described in connection with the downlink transmission by the NodeB 910, the transmit processor 980 provides various signal processing functions including CRC codes, coding and interleaving to facilitate FEC, mapping to signal constellations, spreading with OVSFs, and scrambling to produce a series of symbols. Channel estimates, derived by the channel processor 994 from a reference signal transmitted by the NodeB 910 or from feedback contained in the midamble transmitted by the NodeB 910, may be used to select the appropriate coding, modulation, spreading, and/or scrambling schemes. The symbols produced by the transmit processor 980 will be provided to a transmit frame processor 982 to create a frame structure. The transmit frame processor 982 creates this frame structure by multiplexing the symbols with information from the controller/processor 990, resulting in a series of frames. The frames are then provided to a transmitter 956, which provides various signal conditioning functions including amplification, filtering, and modulating the frames onto a carrier for uplink transmission over the wireless medium through the antenna 952.

The uplink transmission is processed at the NodeB 910 in a manner similar to that described in connection with the receiver function at the UE 950. A receiver 935 receives the uplink transmission through the antenna 934 and processes the transmission to recover the information modulated onto the carrier. The information recovered by the receiver 935 is provided to a receive frame processor 936, which parses each frame, and provides information from the frames to the channel processor 944 and the data, control, and reference signals to a receive processor 938. The receive processor 938 performs the inverse of the processing performed by the transmit processor 980 in the UE 950. The data and control signals carried by the successfully decoded frames may then be provided to a data sink 939 and the controller/processor, respectively. If some of the frames were unsuccessfully decoded by the receive processor, the controller/processor 940 may also use an acknowledgement (ACK) and/or negative acknowledgement (NACK) protocol to support retransmission requests for those frames.

The controller/processors 940 and 990 may be used to direct the operation at the NodeB 910 and the UE 950, respectively. For example, the controller/processors 940 and 990 may provide various functions including timing, peripheral interfaces, voltage regulation, power management, and other control functions. The computer readable media of memories 942 and 992 may store data and software for the NodeB 910 and the UE 950, respectively. A scheduler/processor 946 at the NodeB 910 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for maintaining reachability at a user equipment (UE), comprising:
   detecting a change in a radio connection between the UE and a peer entity, wherein the change in the radio connection is associated with the UE entering an idle state;
   notifying, by a modem processor, an application of the UE that the UE is to enter the idle state in response to detecting the change in the radio connection between the UE and the peer entity;
   communicating, from the application of the UE to an application of the peer entity and via the modem processor, in response to the change in the radio connection being detected, an indication that the UE is to enter the idle state and that the UE is reachable for a specified duration of time while in the idle state, wherein the communicating comprises communicating to the peer entity an indication that the peer entity is not to attempt to reach the UE during the specified duration of time; and
   entering the idle state after communicating the indication to the peer entity.

2. The method of claim 1, wherein the communicating comprises communicating the indication by the modem processor of the UE to a modem processor of the peer entity.

3. The method of claim 1, wherein the detecting the change in the radio connection comprises detecting that utilization of the radio connection between the UE and the peer entity is less than a threshold.

4. The method of claim 1, wherein the detecting the change in the radio connection comprises detecting that a quality metric of the radio connection between the UE and a serving cell is less than a threshold.

5. The method of claim 4, further comprising
   initiating a radio recovery procedure in response to the quality metric of the connection between the UE and the serving cell being less than the threshold;
   determining whether the radio recovery procedure has failed; and
   entering the idle state in response to a determination that the radio recovery procedure has failed.

6. The method of claim 1, wherein the detecting the change in the radio connection comprises detecting that the radio connection between the UE and the peer entity is to be released.

7. The method of claim 6, further comprising initiating, at the UE, the release of the radio connection.

8. The method of claim 6, wherein a network entity in communication with the UE initiates the release of the radio connection.

9. The method of claim 1, further comprising communicating by the application on the UE with the application on the peer entity using the radio connection.

10. The method of claim 1, further comprising providing, by the modem processor, an application programming interface to the application processor to enable the application processor to invoke the functionality of the modem processor when the UE is in the idle state.

11. A computer program product for maintaining reachability at a user equipment (UE), comprising:
    a non-transitory computer-readable medium, including code executable by a computer to:
      detect a change in a radio connection between the UE and a peer entity, wherein the change in the radio connection is associated with the UE entering an idle state;

notify, by a modem processor, an application of the UE that the UE is to enter the idle state in response to detecting the change in the radio connection between the UE and the peer entity;

communicate, from the application of the UE to an application of the peer entity and via the modem processor, in response to the change in the radio condition being detected, an indication that the UE is to enter the idle state and that the UE is reachable for a specified duration of time while in the idle state, wherein the code executable by the computer to communicate to the peer entity comprises code executable by the computer to communicate to the peer entity an indication that the peer entity is not to attempt to reach the UE during the specified duration of time; and enter the idle state after communicating the indication to the peer entity.

12. The computer program product of claim 11, wherein the code executable by the computer to communicate to the peer entity comprises code executable by the computer to communicate the indication by the modem processor of the UE to a modem processor of the peer entity.

13. The computer program product of claim 12, wherein the non-transitory computer-readable medium further includes code executable by the computer to provide, by the modem processor, an application programming interface to the application processor to enable the application processor to invoke the functionality of the modem processor when the UE is in the idle state.

14. The computer program product of claim 11, wherein the code executable by the computer to detect the change in the radio connection comprises code executable by the computer to detect that utilization of the radio connection between the UE and the peer entity is less than a threshold.

15. The computer program product of claim 11, wherein the code executable by the computer to detect the change in the radio connection comprises code executable by the computer to detect that a quality metric of the radio connection between the UE and a serving cell is less than a threshold.

16. The computer program product of claim 15, wherein the non- transitory computer-readable medium further includes code executable by the computer to:
initiate a radio recovery procedure in response to the quality metric of the connection between the UE and the serving cell being less than the threshold;
determine whether the radio recovery procedure has failed; and
enter the idle state in response to a determination that the radio recovery procedure has failed.

17. The computer program product of claim 11, wherein the code executable by the computer to detect the change in the radio connection comprises code executable by the computer to detect that the radio connection between the UE and the peer entity is to be released.

18. The computer program product of claim 17, wherein the non-transitory computer-readable medium further includes code executable by the computer to initiate, at the UE, the release of the radio connection.

19. The computer program product of claim 17, wherein a network entity in communication with the UE initiates the release of the radio connection.

20. The computer program product of claim 11, wherein the non-transitory computer-readable medium further includes code executable by the computer to communicate by the application on the UE with the application on the peer entity using the radio connection.

21. An apparatus for maintaining reachability at a user equipment (UE), comprising:
means for detecting a change in a radio connection between the UE and a peer entity, wherein the change in the radio connection is associated with the UE entering an idle state;
means for notifying, by a modem processor, an application of the UE that the UE is to enter the idle state in response to detecting the change in the radio connection between the UE and the peer entity;
means for communicating, from the application of the UE to an application of the peer entity and via the modem processor, in response to the change in the radio condition being detected, an indication that the UE is to enter the idle state and that the UE is reachable for a specified duration of time while in the idle state, wherein the means for communicating comprises means for communicating to the peer entity an indication that the peer entity is not to attempt to reach the UE during the specified duration of time; and
means for entering the idle state after communicating the indication to the peer entity.

22. The apparatus of claim 21, wherein the means for communicating comprises means for communicating the indication by the modem processor of the UE to a modem processor of the peer entity.

23. The apparatus of claim 21, wherein the means for detecting the change in the radio connection comprises means for detecting that utilization of the radio connection between the UE and the peer entity is less than a threshold.

24. The apparatus of claim 21, wherein the means for detecting the change in the radio connection comprises means for detecting that a quality metric of the radio connection between the UE and a serving cell is less than a threshold.

25. The apparatus of claim 24, further comprising
means for initiating a radio recovery procedure in response to the quality metric of the connection between the UE and the serving cell being less than the threshold;
means for determining whether the radio recovery procedure has failed; and
means for entering the idle state in response to a determination that the radio recovery procedure has failed.

26. The apparatus of claim 21, wherein the means for detecting the change in the radio connection comprises means for detecting that the radio connection between the UE and the peer entity is to be released.

27. The apparatus of claim 26, further comprising means for initiating, at the UE, the release of the radio connection.

28. The apparatus of claim 26, wherein a network entity in communication with the UE initiates the release of the radio connection.

29. The apparatus of claim 21, further comprising means for communicating by the application on the UE with the application on the peer entity using the radio connection.

30. The apparatus of claim 21, further comprising means for providing, by the modem processor, an application programming interface to the application processor to enable the application processor to invoke the functionality of the modem processor when the UE is in the idle state.

31. An apparatus for maintaining reachability at a user equipment (UE), comprising:
a processor coupled to a memory storing instructions for executing:

a radio connection change component configured to detect a change in a radio connection between the TIE and a peer entity, wherein the change in the radio connection is associated with the UE entering an idle state;

a modem processor component configured to notify an application of the UE that the UE is to enter the idle state in response to detecting the change in the radio connection between the UE and the peer entity;

an indication communicating component configured to communicate, from the application of the UE to an application of the peer entity and via the modem processor, in response to the change in the radio condition being detected, an indication that the UE is to enter the idle state and that the UE is reachable for a specified duration of time while in the idle state, wherein the indication communicating component is further configured to communicate to the peer entity an indication that the peer entity is not to attempt to reach the UE during the specified duration of time; and an idle state component configured to cause the UE to enter the idle state after communicating the indication to the peer entity.

32. The apparatus of claim 31, wherein the indication communicating component is configured to cause a modem processor component including the processor and memory to communicate the indication to the modem processor component including the processor and memory of the peer entity over the radio connection.

33. The apparatus of claim 31, wherein the radio connection change component is configured to detect that utilization of the radio connection between the UE and the peer entity is less than a threshold.

34. The apparatus of claim 31, wherein the radio connection change component is configured to detect that a quality metric of the radio connection between the UE and a serving cell is less than a threshold.

35. The apparatus of claim 34, further comprising:

a radio recovery component configured to initiate a radio recovery procedure in response to the quality metric of the connection between the UE and the serving cell being less than the threshold;

wherein the radio recovery component is further configured to determine whether the radio recovery procedure has failed; and wherein the idle state component is further configured to cause the UE to enter the idle state in response to a determination that the radio recovery procedure has failed.

36. The apparatus of claim 31, wherein the radio connection change component is configured to detect that the radio connection between the UE and the peer entity is to be released.

37. The apparatus of claim 36, wherein the radio connection change component is further configured to initiate the release of the radio connection.

38. The apparatus of claim 36, wherein a network entity in communication with the UE initiates the release of the radio connection.

39. The apparatus of claim 31, further comprising a radio link communication component including the processor and memory configured to enable communications by the application on the UE with the application on the peer entity using the radio connection.

40. The apparatus of claim 31, wherein the modem processor component is further configured to provide an application programming interface to the application processor to enable the application processor to invoke the functionality of the modem processor when the UE is in the idle state.

* * * * *